United States Patent Office 3,456,125
Patented July 15, 1969

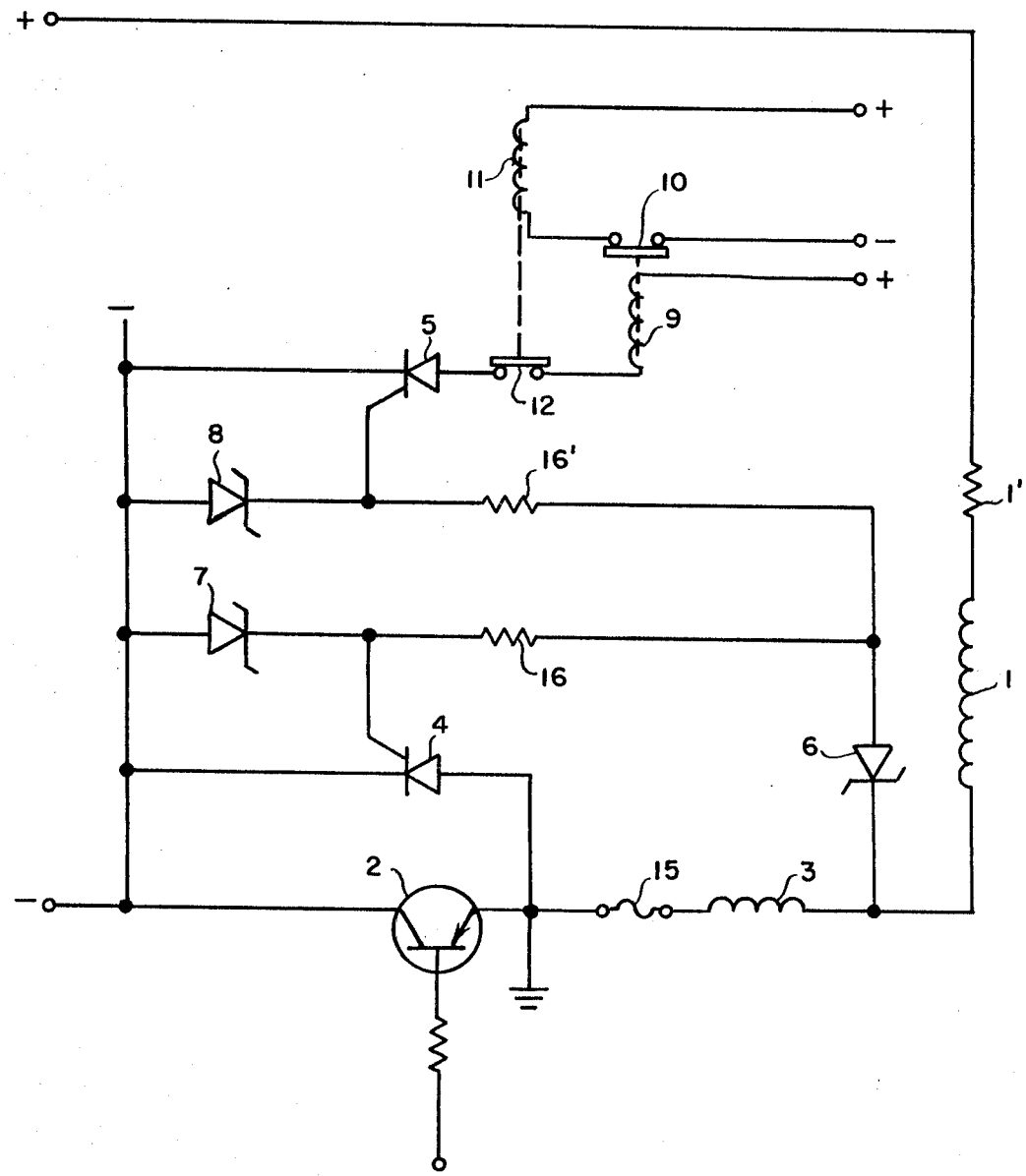

3,456,125
HIGH SPEED PROTECTIVE CIRCUIT FOR REGULATING TRANSISTORS
Maurice Cousin and Robert Klein, Belfort, Yves Loiselet, Danjoutin, and Gilbert Sonet, Grosmagny, France, assignors to Societe Generale de Constructions Electriques et Mecaniques (Alsthom), Paris, France, a corporation of France
Filed June 1, 1967, Ser. No. 642,833
Int. Cl. H02h 7/20
U.S. Cl. 307—202                                6 Claims

ABSTRACT OF THE DISCLOSURE

An inductance is connected in series with the load circuit of the regulating transistor; the regulating transistor is shorted by a normally nonconductive SCR, which is fired by a trigger impulse derived from the inductive voltage surge in case of short circuit.

---

The present invention relates to a high speed protective circuit for a regulating transistor, in circuit with a load, and more particularly a protective circuit utilizing semiconductor controlled rectifiers to protect a series-connected power transistor.

Regulating circuits, utilizing series-connected power transistors have to be very rapidly acting in order to protect such a transistor in case of short circuit of the load. Protective circuits, sensitive to excessive voltage, connected in parallel to the transistor are known. Such protective circuits usually include a thyratron device, such as, for example, a silicon controlled rectifier (SCR). The SCR is connected to short circuit the regulating transistor. Its control signal, that is, the signal to fire the SCR is obtained from the resistance in series with the main load circuit. If a plurality of regulating transistors are used, a single SCR can be connected across all of them.

Regulating circuits of this kind have been found to have an excessive operating time with respect to the sensitivity of the transistors they are to protect, and the margin of safety of protection of the transistor is small.

It is an object of the present invention to provide a high speed protective circuit which acts rapidly and is capable of effectively protecting regulating transistors.

SUBJECT MATTER OF THE INVENTION

Briefly, in accordance with the present invention, an inductance is connected in series with the load circuit, so that the load current passes through the inductance. The control signal to fire the SCR is then obtained from the terminals of the inductance. The inductive surge, upon occurrence of a short circuit, effectively triggers the SCR, which rapidly becomes conductive, and short circuits the transistor (or transistors) before the full short circuit current could pass through the regulating transistor.

Control of the SCR thus does not depend on the normal current through the load, but rather on the slope, or change in current from normal load current to short circuit, and regulating action is thus very quick, efficiently protecting the transistor (or transistors) in case of short circuit across the load.

The control signal to control the protective SCR can also be used to effect further protective action, for example, to control operation of a circuit interruptor, switches or the like, which effectively remove the entire circuit from the source of supply. Such additional control action can be direct, or by means of relays.

The structure, organization and operation of the invention will now be described more specifically with reference to the accompanying drawings wherein: the single drawing illustrates a circuit diagram of the protective circuit in accordance with the present invention.

A current source, schematically indicated by terminals + and − is connected to an inductive load schematically indicated by inductance 1 and resistance 1'. A regulating transistor 2 is in series with the circuit supplying the load. A fuse 15, provided to fuse the entire circuit; such fuses are, however, usually too slow to effectively protect transistor 2. The control circuit for the transistor 2 itself is not shown since it does not form part of the present invention. The main current path of an SCR 4 is connected to be across the collector-emitter circuit of the transistor. Normally this SCR is nonconductive.

In accordance with the present invention, an inductance 3 is connected in series with the transistor 2 and load 1, 1' so that the main current passes through inductance 3. The control electrode of SCR 4 is connected to the inductance 3 so that the control circuit of the SCR will be across the inductance 3 as shown. A Zener diode 6 is in series with the control circuit for the control electrode of SCR 4. A small dropping resistor 16 is also provided.

If the load 1, 1' is short-circuited, the entire voltage of the voltage source will be applied across the terminals of the transistor, opposite the inductance 3. If, as can be assumed, the resistance of the transistor 2 is low with respect to the impedance of inductance 3, practically the entire voltage of the source will appear across the inductance. The inductive surge, proportional to the slope of the current increase, across the inductance 3 will fire the SCR 4, which will place an effective short-circuit across the transistor 2.

In accordance with a feature of the invention, the control potential derived from inductance 3 is also utilized by a second SCR 5, having its control electrode likewise connected over a small dropping resistor 16'. SCR 5, upon firing, is arranged to operate a relay having a coil 9 connected to remove power from the load.

Zener diode 6 is preferably provided in the circuit to prevent firing of SCR 4 under normal operating conditions, and to provide for precise triggering of the control electrode by a well-defined control potential across inductance 3. Thus, small and normal increases in current, for example, upon connecting a normal load, will not cause such voltage surges as well pass Zener diode 6. Yet, when the potential across the terminals of the transistor 2 rises for some reason or other, and tends to pass beyond a predetermined limit SCR 4 will fire, entirely apart from a short circuit across loads 1, 1'.

Zener diodes 7 and 8 are provided in order to prevent application of excessive high tension between the control electrodes and the cathodes of the SCR's 4 and 5.

SCR 4 thus protects the transistor 2 against short circuits. When SCR 5 fires, coil 9 will be excited, causing opening of a main switch 10 of a circuit supplying a holding coil 11 of an interruptor, not shown, which thus can cut the power supply to the circuit. At that point, the SCR 4 will extinguish. An auxiliary contact 12 of the circuit disconnector 11 opens and extinguishes the SCR 5.

The circuit can be reclosed immediately. If the short circuit subsists, it will open automatically again, without damage to the regulating transistor, since the slope of the rapidly increasing current through inductance 3 will fire the SCR's 4, 5, as before.

The signal obtained from inductance 3 can be applied to SCR's 4, 5 directly; if desired, it can also be applied indirectly, for example, over passive elements, such as transformers, or over other intermediate semi-conductor elements.

Various structural changes and modifications, as determined by the requirements of particular applications or uses may be made without departing from the inventive concept.

We claim:
1. In a high speed protective circuit for a regulating transistor, in circuit with a load;
a controlled discharge device having a main current path in parallel with said transistor and having a control electrode circuit;
the improvement comprising
an inductance connected in series with the load circuit so as to carry the load current; and means connecting the control electrode circuit of said controlled discharge device in parallel to said inductance whereby, upon occurrence of a short circuit, the inductive voltage surge applied to said control electrode circuit will fire the discharge device to short circuit the transistor.

2. Circuit as claimed in claim 1 wherein said controlled discharge device is an SCR having its main current carrying path connected across said transistor; said inductance being in circuit between said transistor and said load; and the terminal of said inductance connected closest to said load also being connected to the control electrode of said SCR.

3. Circuit as claimed in claim 1 including a Zener diode in series with said control circuit to provide for triggering of said control circuit by a predetermined value of inductive voltage, as determined by the characteristics of said Zener diode.

4. Circuit as claimed in claim 2 including a Zener diode in series with the circuit interconnecting the terminal of the inductance closest to the load and the control electrode of the SCR.

5. Circuit as claimed in claim 4 including a further Zener diode connected from said control electrode to the cathode of the SCR to limit the voltage across said SCR.

6. Circuit as claimed in claim 1 including an additional discharge device having its control electrode circuit connected in parallel with said first discharge device; means providing a source of potential; and circuit control elements connected from said source of potential to the main current path of said additional discharge device, said circuit control elements being connected to control the circuit which includes said regulating transistor.

References Cited
UNITED STATES PATENTS

| | | | |
|---|---|---|---|
| 2,925,548 | 2/1960 | Scherer | 317—33 |
| 3,253,189 | 5/1966 | Wouk | 317—33 |
| 3,353,066 | 11/1967 | Souza | 317—50 |
| 3,371,262 | 2/1968 | Bird et al. | 317—33 |

OTHER REFERENCES 1,109,258  6/1961  Germany.

JOHN W. HUCKERT, Primary Examiner

JERRY D. CRAIG, Assistant Examiner

U.S. Cl. X.R.

307—252, 297; 317—33, 148.5; 323—22